Aug. 25, 1959 J. G. KAISER 2,900,780
FRUIT PICKER WITH FIXED CUTTER
Filed Oct. 22, 1957
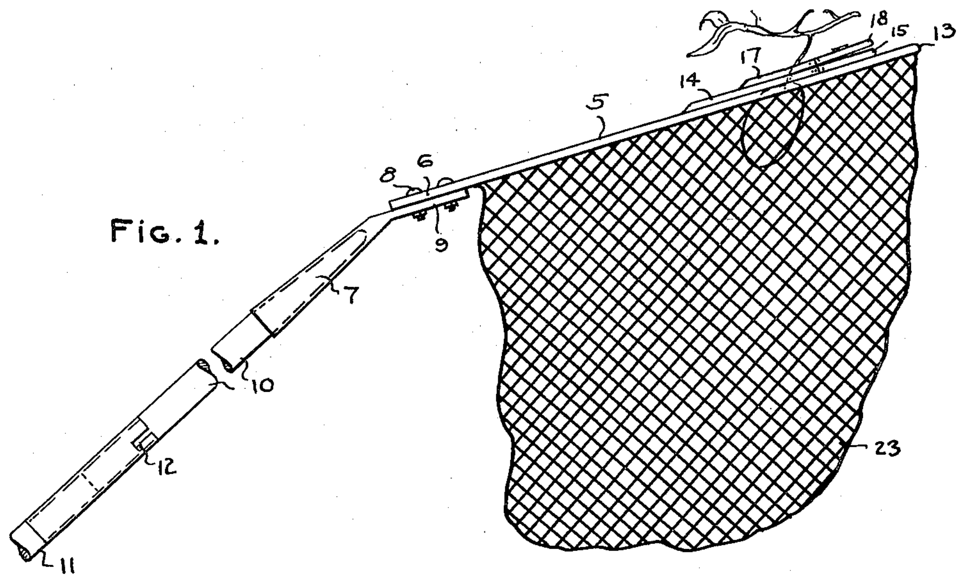
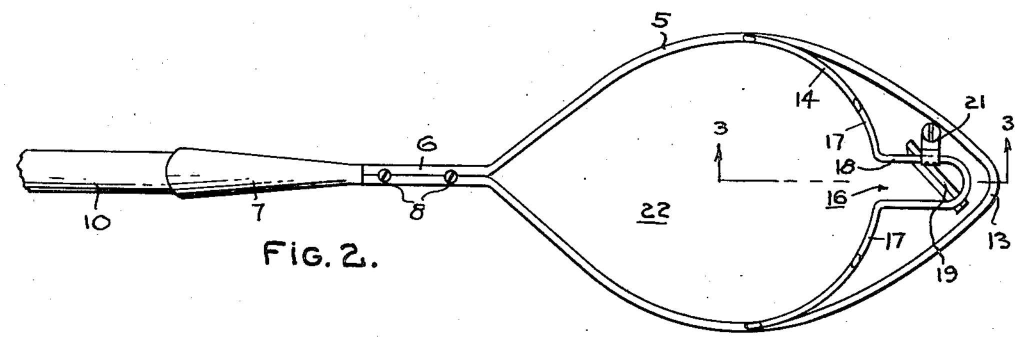
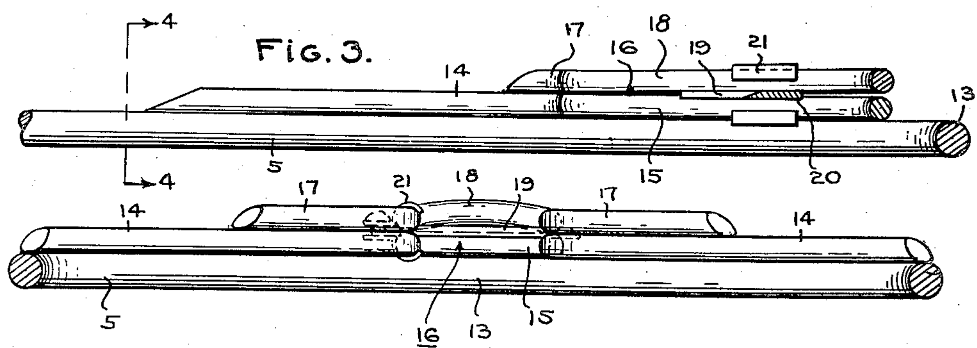
INVENTOR.
JOHN G. KAISER,
BY
James K. Lyle
ATTORNEY.

United States Patent Office 2,900,780
Patented Aug. 25, 1959

2,900,780

FRUIT PICKER WITH FIXED CUTTER

John G. Kaiser, Fort Lauderdale, Fla.

Application October 22, 1957, Serial No. 691,603

1 Claim. (Cl. 56—339)

This invention relates to fruit pickers and has particular reference to a novel form of such a device that is constructed in a manner to be easily elevated and engaged through relatively heavy foliage for engaging the fruit.

The invention contemplates a metallic frame of generally oval form that is provided at one end with a ferrule for the reception of a sectional pole whereby the device may be controlled at various elevations and with the frame tapering forwardly to a relatively small arcuate end that functions as the means for guiding the frame through the foliage and to the fruit.

The invention further contemplates a novel form of fruit picker as above noted and wherein the frame is provided with superposed frame members that are convergent to form a relatively narrow slot into which the stem of the fruit is guided and with the slot being bisected by an angularly disposed cutting blade and whereby, when the frame is pulled against the stem of the fruit, the stem is severed in a slicing action that causes it to drop within a suitable textile bag supported by the frame.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

Figure 1 is a side elevation of the device constructed in accordance with the invention, Figure 2 is a plan view of the device and wherein a textile receptacle is omitted, Figure 3 is an enlarged fragmentary longitudinal section taken substantially on line 3—3 of Figure 2 and, Figure 4 is a transverse sectional view of the device taken substantially on line 4—4 of Figure 3.

Referring specifically to the drawings, the numeral 5 designates a substantially oval metallic frame, formed of a single section of cylindrical material. The terminal ends 6 of the frame are joined together in parallel relation and preferably welded together to constitute a connection for a ferrule 7. Screws or like fastening devices 8 serve to connect a flat tongue 9 of the ferrule rigidly with respect to the frame and with the ferrule being angularly arranged. The ferrule carries a fixed cylindrical pole section 10 that is connected to cumulative pole sections 11 through the medium of a bayonet slot connection 12 and whereby the length of the pole may be varied in accordance with the elevation of the fruit to be picked. The frame 5 at its forward end is rounded at 13 to aid in forcing the device through relatively heavy foliage to the point of location of the fruit to be picked.

Rigidly and permanently connected upon the frame 5, in any suitable manner, is a superposed arcuate frame member 14. The frame member 14 intermediate its length is bent at 15 to form a relatively narrow generally rectangular slot 16. The slot 16 as clearly shown in Figure 2, is arranged adjacent to and inwardly of the forward end of the frame 5. Supported upon the frame 14 to be substantially parallel therewith, is a second superposed frame 17, the terminal ends of which are fixedly connected upon the frame 14. The frame 17 intermediate its length is bent at 18 to conform to the slot 16 and with the frame 17 being relatively flexible upwardly from its points of connection with the frame 14. Diagonally disposed between the frame members 14 and 17 to bisect the slot 16, is a cutting knife 19. The knife 19 is preferably diagonally arranged and has its lower face seating within notches 20 formed in the upper side of the frame 14 to accurately dispose the knife in its diagonal relation to the slot. Any suitable clamp device 21 engages both the frames 14 and 17 to clamp the upper frame 17 in firm engagement with the upper surface of the knife. The knife is thus replaceable or removable for sharpening. The frames 5 and 14 define a relatively large opening 22 that leads into the slot 16. Any suitable and preferably textile receptacle 23 is connected with the frame 5 throughout its circumference to furnish a means to collect the fruit as it is severed. The receptacle 23 is preferably removably connected to the frame 5 by lacing or the like and whereby it may be readily removed for cleaning purposes.

In the use of the device, the operator determines the height of the fruit to be picked and accordingly accumulates the required number of poles 11 in order to engage the fruit. With the poles in assembled relation with respect to the picker, the device is elevated and engaged through the foliage of the tree, forcing its way through by the nose or end portion 13 of the frame 5. The frame is then elevated, disposing the fruit into the large opening 22, at which time the frame is pulled outwardly, causing the stem of the fruit to enter the slot 16 where it is engaged and severed by the knife 19, causing the fruit to drop into the receptacle 23. The arcuate form of the frame 14 additionally serves to guide the fruit stem to the slot. The cutting is a slicing action and avoids injury to the fruit, since the stem is not pulled away. The operation is repeated until the receptacle is loaded, at which time the device is lowered by the poles 11 to be dumped. As the picking progresses, the device is elevated by the use of additional poles 11, thus greatly facilitating the picking of the fruit throughout the height of any relatively large tree and the device is particularly applicable as a commercial mango and avocado picker and functions successfully in picking such fruit of varying sizes. The device functions successfully also as a picker for citrus fruits.

It will be apparent from the foregoing that a very novel form of fruit picker has been provided. The several frame members are formed of round metallic stock and bent to the required arcuate shapes and assembled by suitable permanent means. The device is particularly useful in the harvesting of mangos and avocados, since it is impractical to harvest such fruit by the use of ladders or the like. The frame is easily engaged through the relatively heavy foliage to engage the fruit and the fruit is severed with a minimum of effort. The arcuate shape of the frame 5 also permits it to be easily withdrawn from the foliage of the tree without hooking or otherwise catching into the branches. The receptacle 23 is easily attached or detached and the ferrule 7 is also easily detached from the connection 6 to facilitate the storage of the device. When the knife 19 is to be replaced or sharpened, the clamp 21 is released and the frame portion 18 flexed upwardly, permitting the removal of the knife from the notches 20.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A fruit picker of the character described that comprises an open frame consisting of a continuous section of relatively heavy wire and with the frame being generally oval and having its forward end terminating in a relatively pointed nose portion that is rounded and of smaller diameter than the opening of the frame, the rear extremities of the frame being straight and parallel and fixedly connected together, a ferrule that is detachably connected to the straight extremities of the frame, the ferrule adapted to receive one of a plurality of cumulative pole sections to support the frame for elevation into a tree for engagement with fruit to be picked, a second frame of arcuate shape overlying and spanning the opening of the first named frame and having its terminal ends permanently connected to the first named frame at opposite sides, the second named frame intermediate its ends defining a rearwardly opening U-shaped slot, the slot overlying the opening of the first named frame adjacent to the nose portion, a third frame that is arcuate in shape and that overlies the second frame to be parallel therewith, the terminal ends of the third frame being permanently connected to the second named frame, the third frame intermediate its width defining a U-shaped slot that is coextensive with the first named slot, the third named frame being flexible upwardly toward and from the second named frame, a cutting knife disposed between the second and third named frames and with the knife diagonally bisecting the slots, the second named frame provided with notches upon its upper side for the seating reception of the knife, a clamp device that engages the second and third named frames for clamping the knife within the notches, a flexible receptacle detachably connected with the first named frame, the first named frame and the second named frame defining a relatively large opening for engagement over the fruit to be picked and with the slots forming a guide for the stem portion of the fruit so that the stem may be severed when the device is pulled rearwardly, the said nose portion of the first named frame defining a leading end to the fruit picker to facilitate its entry into the foliage of a tree.

References Cited in the file of this patent

UNITED STATES PATENTS

| | | |
|---|---|---|
| 55,150 | Newcomb | May 29, 1866 |
| 57,473 | Carpenter | Aug. 28, 1866 |
| 132,634 | Colthar | Oct. 29, 1872 |
| 441,971 | Potterf | Dec. 2, 1890 |
| 787,164 | Fisher | Apr. 11, 1905 |
| 908,235 | Frampton | Dec. 29, 1908 |